(No Model.)

A. E. SMITH.
Carriage Axle.

No. 232,560. Patented Sept. 21, 1880.

Attest:
J Henry Kaiser
J. A. Rutherford

Inventor:
Alfred E. Smith.
By James L. Norris
Atty.

UNITED STATES PATENT OFFICE.

ALFRED E. SMITH, OF BRONXVILLE, NEW YORK.

CARRIAGE-AXLE.

SPECIFICATION forming part of Letters Patent No. 232,560, dated September 21, 1880.

Application filed May 24, 1880. (No model.)

*To all whom it may concern:*

Be it known that I, ALFRED E. SMITH, a citizen of the United States, residing at Bronxville, in the county of Westchester and State of New York, have invented new and useful Improvements in Carriage-Axles, of which the following is a specification.

This invention relates to certain improvements in axles for vehicles; and it consists in the combination, with an axle having a tapering spindle, of the removable collar formed with conical bearings and fitted upon the spindle, and the axle-box provided at its inner end with bearings corresponding with the two conical bearings of the removable collar, the said collar being held in place upon the spindle by the axle-box, and the axle-box being held upon the spindle with its bearings abutting against the conical bearings of the removable collar by a screw-nut formed with a beveled flange and screwed upon the screw-threaded end of the spindle, as more fully hereinafter set forth.

Figure 1:
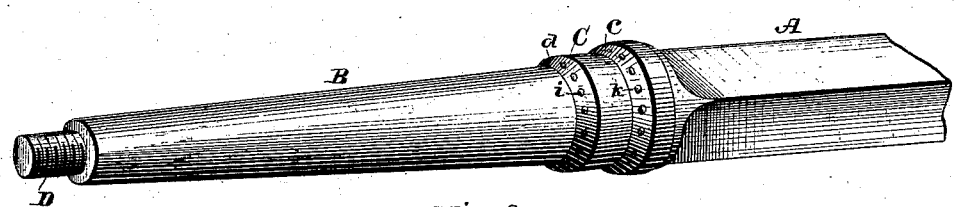
Figure 2:
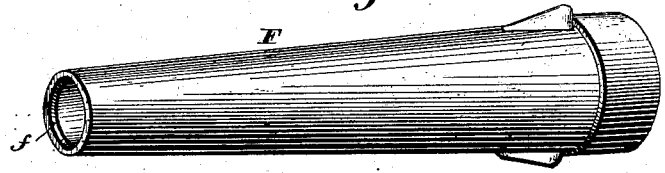
Figure 3:
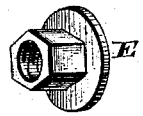
Figure 4:
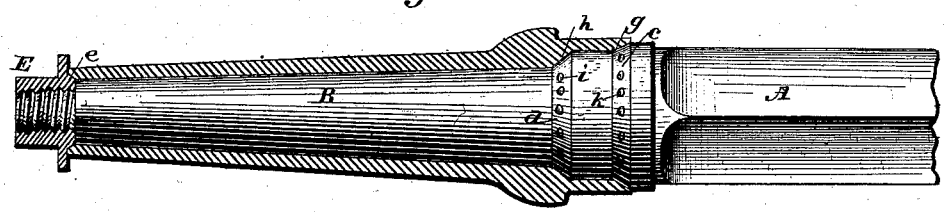
Figure 5:

In the accompanying drawings, Figure 1 represents a perspective view of an axle showing my improvement; Fig. 2, a perspective view of the axle-box; Fig. 3, a perspective view of the securing-nut detached; Fig. 4, a view, partially in elevation and partially in section, of the axle and axle-box; and Fig. 5, a detached sectional view of the removable collar.

The letter A indicates the shank of the axle, and B the spindle thereof, which tapers toward its end in the usual manner.

The letter C indicates the removable collar, which is formed with double conical bearings $c\ d$, as shown. The said collar is made as a separate piece and secured upon the spindle against the shoulder at the shank. The said collar may be made of steel or of iron and case-hardened to render it strong and durable, so that it will seldom require to be renewed. The end of the spindle is screw-threaded, as shown at D, by means of which a screw-nut, E, may be secured upon its end to confine the axle-box F in place. The inner end of the axle-box is formed with bearings $g\ h$, corresponding to the bearings $c$ and $d$, which bearings $g\ h$ abut against said bearings $c$ and $d$ when the box is in position.

The screw-nut E is provided with an annular beveled flange, $e$, and the outer end of the axle-box is beveled at the same angle, as shown at $f$, forming metal bearing-faces when the box is in position on the spindle.

The conical bearings $c\ d$ are provided with recesses or indentations $i\ k$ for the reception of lubricating material or compound for lubricating the bearing-surfaces of the axle-spindle and the axle-box.

Owing to the peculiar construction of the collar with double conical bearing-surfaces the box may be set with the utmost nicety upon the spindle and the contiguous surfaces brought closely together, so as to give the most substantial support for the wheel. The axle-box being fitted thus against the collar holds it securely in place, and the screw-nut with its beveled flange holds the axle-box in place upon the spindle and against the collar.

I am aware that the spindle portion of an axle has been made tapering from a collar, as shown in Patent No. 219,962, and do not therefore desire to be understood as claiming such broadly.

What I claim is—

The combination, with an axle having a tapering spindle, of the removable collar C, formed with conical bearings $c\ d$ and fitted upon the spindle, and the axle-box F, provided at its inner end with bearings $g\ h$, corresponding with the two conical bearings of the removable collar, the said collar being held in place upon the spindle by the axle-box, the axle-box being held upon the spindle with its bearings abutting against the conical bearings of the removable collar by a screw-nut formed with a beveled flange, $e$, and screwed upon the screw-threaded end of the spindle, substantially as herein shown and described.

In testimony whereof I have hereunto set my hand in the presence of two subscribing witnesses.

ALFRED E. SMITH.

Witnesses:
JAMES L. NORRIS,
JAMES A. RUTHERFORD.